Patented May 10, 1932

1,857,553

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

ANTHRAQUINONYL-AMINO DERIVATIVES OF BENZANTHRONEPYRAZOLANTHRONE

No Drawing. Application filed August 9, 1930, Serial No. 474,303, and in Germany August 14, 1929.

The present invention relates to vat dyestuffs derived from benzanthronepyrazolanthrone and process of producing same.

We have found that valuable vat dyestuffs are obtained by condensing a halogen-N-benzanthronepyrazolanthrone with an organic compound corresponding to the general formula R—X—Y, wherein R is an organic radical, X a —NH—group in which the hydrogen atom may be replaced by an alkyl radicle, —O—, or —S—, and Y hydrogen or a metal atom. The said condensing components comprise, therefore, organic compounds in which a reactive hydrogen or metal atom is attached to an organic radicle by means of nitrogen, oxygen or sulphur. The most important products are the imines, in particular the diimines in which the same aromatic radicle, preferably such as is capable of being vatted and contains a system of at least three condensed rings, is attached by means of —NH-groups twice to the N-benzanthronepyrazolanthrone radicle.

The halogen derivatives of N-benzanthronepyrazolanthrone employed as initial materials may be obtained by the action of halogen or agents supplying halogen, such as for example sulphuryl chloride, phosphorus halides, or metal halides, for example iron chloride and aluminium chloride, in the absence of any diluent or in inorganic media, for example in sulphuric acid and derivatives thereof, such as chlorosulphonic acid or oleum, melts of anhydrous metal halides, in particular metal chlorides, to which substances lowering the melting point may be added. The halogenation is preferably carried out in the presence of one or several of the known halogenating catalysts. Particularly useful for the purpose of our invention are the bromo derivatives of N-benzanthronepyrazolanthrone prepared in the aforedescribed manner, in particular those bromo derivatives as dye substantially more greenish blue shades than the unsubstituted N-benzanthronepyrazolanthrone which are obtainable by bromination in acid solution, for example chlorosulphonic acid, at temperatures between about 40° and 60° C. in the presence of halogenating catalysts, for example non-metals, such as iodine or sulphur, or which are produced by bromination in the absence of diluents.

The condensation of the halogen-N-benzanthronepyrazolanthrones with the before mentioned organic compounds is preferably carried out in organic diluents of high boiling point, such as nitrobenzene, chlorobenzene, naphthalene and derivatives thereof in the presence of acid-binding agents, such as the oxides of alkaline earth metals, or alkaline salts thereof, and of condensing catalysts; for example metals and compounds thereof, such as copper, copper oxide, nickel, nickel carbonate and silver oxide. The yields are usually practically quantitative and the reaction products are obtained almost throughout in the crystalline form.

The imines obtained as aforedescribed may, if desired, be subjected to alkylation, acylation, or further condensation by means of acid or alkaline condensing agents during the condensation or subsequently to it, and in this case dyestuffs which usually have different shades of color are obtained. Acid or alkaline condensing agents are, for example, sulphuric acid to which manganese dioxide may be added, aluminium chloride the melting point of which may be lowered by an addition of common salt, or caustic alkali.

The resulting dyestuffs may be converted by the usual methods into their leuco compounds as for example their leuco esters.

The following examples will further illustrate the nature of this invention, but the invention is not restricted to these examples. The parts are by weight.

Example 1

62 parts of the dibromobenzanthronepyrazolanthrone obtainable by treating N-benzanthronepyrazolanthrone with bromine in chlorosulphonic acid in the presence of iodine at about 40° C., are boiled while stirring in 1000 parts of naphthalene with 46 parts of 1-aminoanthraquinone, after the addition of 50 parts of sodium acetate and 12 parts of copper oxide, until a sample taken out is practically free from bromine. The reaction mixture is then allowed to cool, is diluted with a diluent of low melting point as for example with monochlorobenzene, and the reaction product is filtered off by suction. The suspending agent may also be distilled off, if desired under reduced pressure and/or with steam. The resulting dyestuff, which is a blue black crystalline powder, dissolves in concentrated sulphuric acid giving a green coloration and yields powerful, gray dyeings having excellent fastness, especially to kier boiling, on cotton from a dark green vat.

By employing the equivalent amount of 1-amino-4-benzoylaminoanthraquinone instead of 1-aminoanthraquinone a product giving greenish gray dyeings is obtained. The same dyestuff is also obtained by condensation of the bromobenzanthronepyrazolanthrone already described in this example with 1.4-diaminoanthraquinone and subsequent benzoylation.

By employing 2-aminoanthraquinone instead of 1-aminoanthraquinone, a dyestuff giving bluish gray dyeings is obtained.

A similar condensation product is obtained by condensing the bromobenzanthronepyrazolanthrone obtainable by bromination of N-benzanthronepyrazolanthrone in oleum with 1-aminoanthraquinone. By employing 2 molecular proportions of 1-aminoanthraquinone-2-aldehyde a dyestuff giving greenish gray dyeings is obtained.

Other suspending agents, such as nitrobenzene may be employed instead of naphthalene.

The corresponding carbazole derivatives which have similar tinctorial properties but which usually have other shades of color may be obtained from these reaction products by subsequent fusion with alcoholic potash or by treatment with aluminium chloride, if desired with the addition of common salt and while leading through a gas having an oxidizing action, such as oxygen or air.

Example 2

6.2 parts of dibromobenzanthronepyrazolanthrone (prepared from benzanthronepyrazolanthrone by bromination in chlorosulphonic acid at from 80° to 90° C. in the presence of manganese as a catalyst) are boiled while stirring in 100 parts of naphthalene with 2.3 parts of 1-aminoanthraquinone and 5 parts of copper acetate until all the 1-aminoanthraquinone has been used up. The reaction mixture is then allowed to cool and is worked up as described in Example 1. The mono-bromo-α-anthraquinonyl-aminobenzanthronepyrazolanthrone thus obtained is a blue black powder which dissolves in concentrated sulphuric acid giving a green coloration and yields powerful, very fast blue gray to blue black dyeings from a blue green vat. The bromine atom present in the reaction product may still be replaced by other radicles by the method according to the present invention.

The condensation product from dibromobenzanthronepyrazolanthrone (obtainable by the action of bromine on N-benzanthronepyrazolanthrone in oleum) and 2 molecular proportions of Bz - 3.5 - dichloro - 4 - aminoanthraquinone-2.1-benzacridone gives green gray dyeings. The beforementioned Bz-3.5-dichloro-4-aminoanthraquinone-2.1-benzacridone is obtainable by reduction of the corresponding nitro compound which may be prepared by nitrating the Bz-3.5-dichloro compound in nitrobenzene by means of nitric acid. The Bz-3.5-dichloro compound is obtainable by treating with reducing agents the Bz - 3.5 - dichloro-4-chloranthraquinone-2.1-benzacridone which may be produced by treating the unsubstituted acridone in nitrobenzene with chlorine in the presence of iodine.

Monobromobenzanthronepyrazolanthrone (prepared by bromination of benzanthronepyrazolanthrone with 1 atomic proportion of bromine in chlorosulphonic acid with iodine as a catalyst) yields a dyestuff giving powerful gray dyeings when condensed with 1-aminoanthraquinone.

Example 3

30 parts of the bromobenzanthronepyrazolanthrone (obtainable as described in Example 1) are boiled while stirring in 1000 parts of nitrobenzene, after the addition of 50 parts of calcined soda, 7 parts of copper oxide and 30 parts of benzamine, until the reaction product is practically free from bromine. The whole is then worked up in the usual manner. The resulting reaction product, which is a dark blue green powder, dissolves in concentrated sulphuric acid giving an olive green coloration, yields a blue vat and gives very fast, green blue dyeings on the vegetable fibre.

Substituted benzamides or the amides of the naphthalene carboxylic acids or anthraquinone carboxylic acids, or acid amides of an even still higher molecular weight react similarly to benzamide.

With para-toluenesulphamide or potassium phthalimide, condensation products are obtained which by treatment with acids are converted into the free amino compounds in an analogous manner to the benzoylamino derivatives.

Example 4

5.5 parts of monobromobenzanthronepyrazolanthrone (obtainable as described in the last paragraph of Example 2) are introduced at from 100° to 120° C. into a suspension of 50 parts of phenol and 20 parts of potassium carbonate, the whole is slowly heated to 180° C. and kept at the same temperature until the reaction is completed. The reaction mixture is then allowed to cool, the excess phenol is distilled off with steam and the reaction product is filtered off by suction. It is a blue powder which dissolves in concentrated sulphuric acid giving a blue coloration and yields fast, navy blue dyeings from a blue vat.

*Example 5*

62 parts of the dibromo-N-benzanthronepyrazolanthrone described in Example 1 are heated to boiling while stirring in 1250 parts of nitrobenzene after the addition of 50 parts of sodium acetate, 10 parts of copper oxide and 82 parts of the 4-amino-Bz-3.5-dichloroanthraquinone-2.1-benzacridone described in Example 2 until the reaction product is free from bromine. The reaction mixture is then worked up as usual. The condensation product obtained in crystalline form in a very good yield dissolves in concentrated sulphuric acid to give a brown violet solution and dyes cotton green gray very fast shades from a blue vat.

A reaction product dyeing olive shades is obtained in an analogous manner from tetrabromo-N-benzanthronepyrazolanthrone.

The equivalent amount of a dichloro derivative may be employed instead of the aforesaid dibromo compound.

What we claim is:

1. As new articles of manufacture vat dyestuffs derived from N-benzanthronepyrazolanthrone corresponding to the formula:

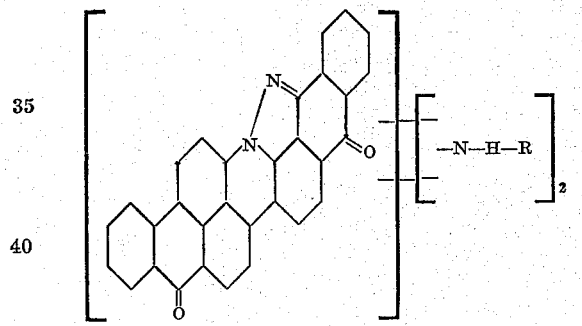

in which R stands for an anthraquinonyl radicle, the dyestuffs dissolving in concentrated sulphuric acid to give green solutions and dyeing cotton greenish to bluish gray shades from green vats.

2. As a new article of manufacture the vat dyestuff corresponding to the formula:

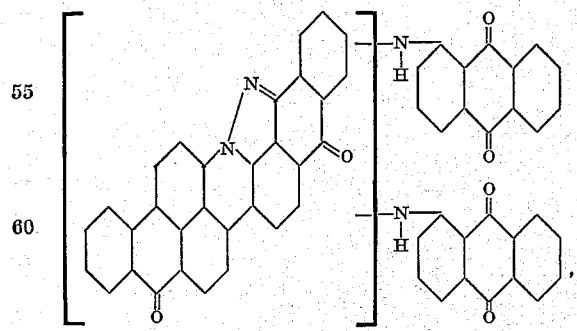

dissolving in concentrated sulphuric acid to give a green solution and dyeing cotton powerful, gray shades from a dark green vat.

In testimony whereof we have hereunto set our hands.

MAX ALBERT KUNZ.
KARL KOEBERLE.